United States Patent Office 2,936,261
Patented May 10, 1960

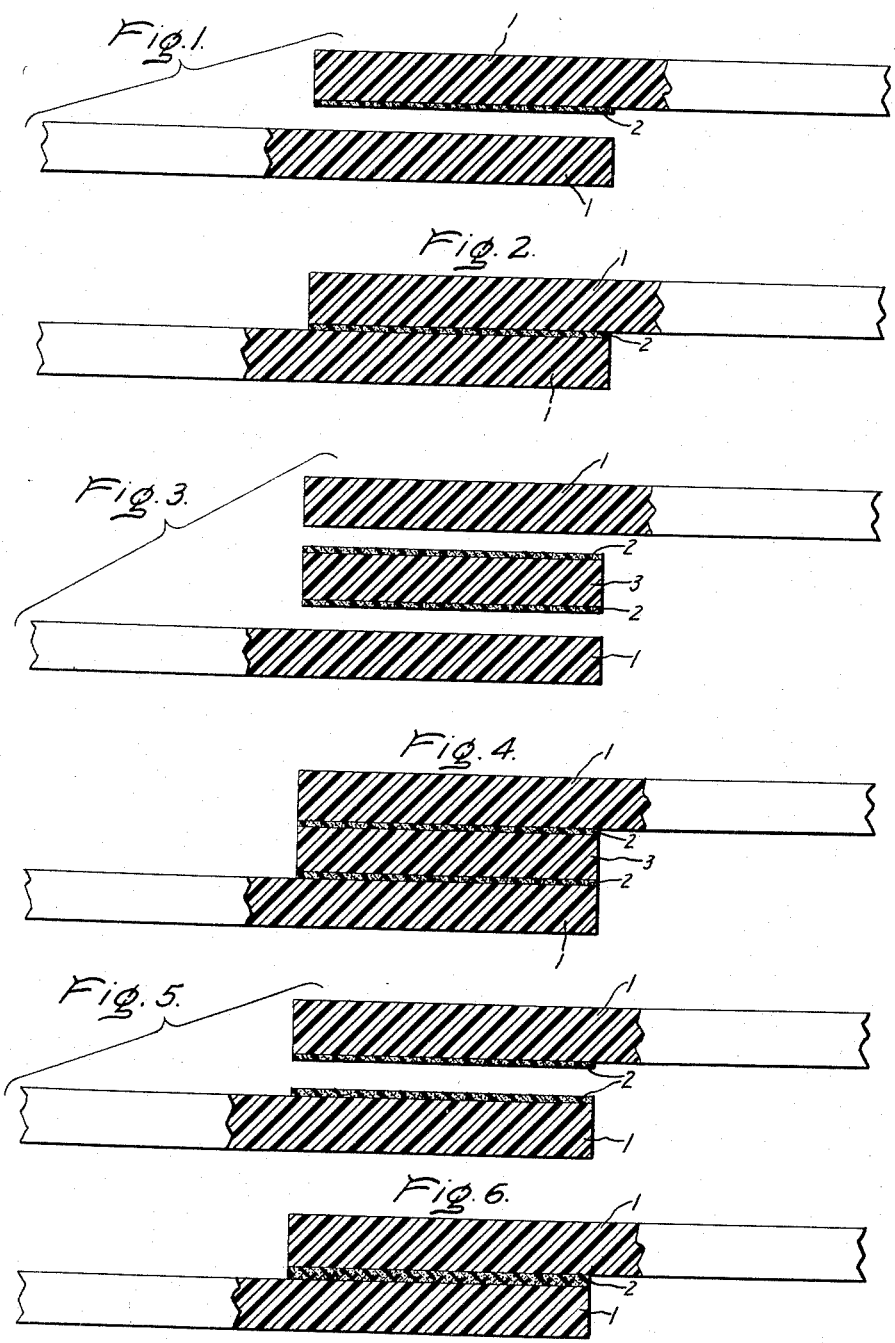

2,936,261
SEALING IRRADIATED POLYETHYLENE

Quintin P. Cole, Pittsfield, Mass., assignor to General Electric Company, a corporation of New York Application May 18, 1955, Serial No. 509,246

17 Claims. (Cl. 154—139)

This invention is concerned with the sealing of polyethylene which has been irradiated with a high energy radiation. More particularly, the invention relates to sealing to itself polyethylene which has been irradiated with high energy radiation, for instance, with gamma rays, high energy electrons, etc., to give seals which have good strength at room temperatures and, where desired, these seals also are strong at elevated temperatures above 100° C., said seals having been obtained by (1) applying as a bonding agent between the surfaces of the irradiated polyethylene it is desired to seal, a free-radical-producing curing agent which is capable of effecting cure of unirradiated polyethylene, superposing the surfaces of the irradiated polyethylene it is desired to seal, and thereafter heating the total assembly under heat and pressure.

In the copending application of Elliott J. Lawton and Arthur M. Bueche, Serial No. 324,552, filed December 6, 1952, and assigned to the same assignee as the present invention, there is disclosed and claimed the irradiation of polyethylene with high energy electrons, to reduce the solubility of the polyethylene in various solvents such as hot toluene, xylene, etc., and to cause the formation of cross links, and hence to convert the polyethylene from a thermoplastic material to a gel which has reduced flow at elevated temperatures and in some respects under certain conditions of irradiation has no flow at elevated temperatures of around 150° to 250° C. or higher. This reduction of solubility and resistance to flow at elevated temperatures is responsible for the desirable properties of the irradiated polyethylene such as its ability to withstand steam sterilization without deformation. This irradiation also enables the polyethylene to withstand environmental stress cracking in the presence of certain organic materials.

However, when employing such irradiated polyethylene in the various applications, for instance, in sterilizable containers, for such items as foods, drugs and medical supplies, made of irradiated polyethylene (where the filling with the items occurs either before or after irradiation with high energy irradiation), it is often desirable to seal the container to form an air-tight seal so that subsequently the container with its contents can be autoclaved at elevated temperatures to render sterile the contents in the container itself. However, because of the fact that the polyethylene has been irradiated, the usual techniques for heat-sealing unirradiated polyethylene whereby the surfaces of the irradiated polyethylene are merely brought into direct contact with each other under heat and pressure, have not been found suitable for obtaining satisfactory bonds. In general, if one attempts to heat-seal the surfaces of irradiated polyethylene which have been irradiated with higher irradiation doses of, for instance, about 6 to $10 \times 10^6$ Roentgens, one will find that under more practical conditions of heat sealing, for instance, at 450° F. for about 0.5 second, the bond at room temperature is quite low. Generally, the seal thus obtained has essentially no cohesive strength at temperatures of about 125° C. and readily delaminates under tension at the aforesaid 125° C. temperature.

Under certain limited conditions, fairly good bonds at room temperature can be obtained by effecting heat sealing between directly contacting surfaces of the irradiated polyethylene provided that the radiation dose introduced into the irradiated polyethylene is of a low value usually from about 1 to $3 \times 10^6$ Roentgens. However, again it is found that at elevated temperatures of about 125° C., the seal itself is extremely weak and readily breaks under slight tension.

Unexpectedly, I have discovered that I am able to effect bonding of irradiated polyethylene surfaces so as to obtain strong bonds not only between surfaces of irradiated polyethylene which have been irradiated with low radiation doses but even between surfaces of irradiated polyethylene which have been irradiated with higher radiation doses, for instance, doses as high as 10 to $50 \times 10^6$ Roentgens. I have also discovered that in addition to the bonds being strong at room temperature, the bonds are also able to resist delamination even under large tensions at elevated temperatures of around 125° C. and even higher for long periods of time. In accordance with my invention, I accomplish the above objectives by effecting heat- and pressure-sealing of the surfaces of the irradiated polyethylene through the medium of a compound producing free radicals which is a curing or vulcanizing agent for unirradiated polyethylene but which unexpectedly is able to cause even irradiated polyethylene surfaces which are generally in the gelled state, to adhere tenaciously at room temperature and, under modified conditions, also at elevated temperatures.

Reference to the attached drawings will lead to a fuller understanding of the nature of the invention and some of the considerations employed in the practice of the present invention.

In the drawings:

Figs. 1, 3 and 5 are cross-sectional views of detailed structural relationships between the irradiated polyethylene and the curing agent employed, either alone or in combination with the thermoplastic polymer.

Figs. 2, 4 and 6 are cross-sectional representations of the bonded areas obtained by applying heat and pressure, respectively, to the assemblies shown in Figs. 1, 3 and 5.

More particularly, Fig. 1 shows terminal portions 1 of flat stock irradiated polyethylene to one of whose inner surfaces has been applied a thin coating of a curing agent for thermoplastic polymers employed in other more specific embodiments of the invention, for example, benzoyl peroxide.

Fig. 2 comprises a cross-sectional area of the bond obtained from the assembly of Fig. 1 in which the surfaces of the irradiated polyethylene are sealed and united by means of the bond produced by applying heat and pressure to the irradiated polyethylene coated with the curing agent.

Fig. 3 is a cross-sectional view of another embodiment of the invention whereby the surfaces of the irradiated polyethylene 1 are superposed in sandwich form on a thermoplastic polymer 3, for example, unirradiated polyethylene, which has previously been coated with thin films of a curing agent 2 for the thermoplastic polymer.

Fig. 4 is the seal obtained by applying heat and pressure to the assembly in Fig. 3 whereby the bond area sealing the surfaces of the irradiated polyethylene comprises the thermoplastic polymer is cured through the medium of the curing agent which has effected its curing and adhesive action on both the thermoplastic polymer and the adjacent surfaces of the irradiated polyethylene.

Fig. 5 is another embodiment of the invention described in Fig. 1 with the exception that the curing agent 2 is applied to both contacting surfaces of the irradiated polyethylene 1 prior to heat sealing.

Fig. 6 shows the seal produced by subjecting the assembly in Fig. 5 to heat and pressure to give a seal in which the surfaces of the irradiated polyethylene are homogeneously united through the medium of the heat-treated curing agent.

Another embodiment which is not shown in the accompanying drawing may be considered similar to Fig. 4 with the exception that instead of employing an interleaf of the thermoplastic polymer, the curing agent is intimately dispersed throughout a finely divided thermoplastic polymer, such as polyethylene, and this mixture of ingredients employed between the adjacent surfaces of the irradiated polyethylene in the heat-sealing operation.

Obviously, other embodiments of the invention could have been depicted by means of drawings, but it is believed that the accompanying drawing, together with the description in the specification, amply describes the presently claimed invention.

There are several embodiments of my invention which depend upon such factors as whether the polyethylene has been irradiated with higher or lower doses of radiation. Taking, for instance, the case where the polyethylene has been irradiated with doses of radiation, for instance, within the range of from about 2 to $20 \times 10^6$ Roentgens, I have found that I am able to obtain strong bonds at room temperature (about 25 to 35° C.) by interposing between the surfaces of the irradiated polyethylene it is desired to bond, an organic compound capable of producing free radicals, which compound is a curing or vulcanizing agent for unirradiated polyethylene. The manner whereby this interposition of the free radical producing compound is accomplished may be varied widely. One method comprises applying a coating of the free-radical-producing compound (which hereinafter will be designated as "curing agent") to either one or both of the contacting surfaces of the irradiated polyethylene. This is advantageously accomplished by means of solutions or dispersions of the curing agent in a suitable liquid medium whereby the liquid medium can be readily volatilized without causing undesirable premature release of the free radicals from the curing agent. When employing such coating techniques and using the curing agent in the form of solutions or dispersions (or even in the dry form where possible), the amount of curing agent deposited on the surfaces of the irradiated polyethylene need not be too large. Generally, I have found that when using solutions of the curing agent, concentrations of the curing agent in a suitable solvent such as xylene, toluene, benzene, etc., are in the range of from about 2 to 15%, by weight, based on the total weight of the solutions which may advantageously be employed. The use of higher or lower concentrations is not precluded.

After application of the curing agent to one or both surfaces of the irradiated polyethylene, the fluid medium required in the application of the curing agent is removed by suitable means such as evaporation, volatilization by application of small amounts of heat, etc., the irradiated polyethylene surfaces are brought in direct contact with each other, and heat and pressure applied in the usual heat-sealing manner employed in connection with the heat-sealing of thermoplastic materials such as polyethylene. If one applies, as described above, the curing agent to polyethylene surfaces irradiated with lower dose ranges, one will find that the strength of the bond is outstandingly good at both room temperature and at elevated temperatures (elevated temperatures herein intended to mean for the most part temperatures at around 125° to 150° C.). However, when the same technique of applying only a curing agent between the surface of the irradiated polyethylene is employed in connection with irradiated polyethylene which has been irradiated at higher doses, for instance, about $25 \times 10^6$ Roentgens and as high as $50 \times 10^6$ Roentgens or more, one will find that fairly satisfactory bond strengths will be obtained at normal temperatures but they will not be equivalent in strength to those obtained at room temperature for the lower dose irradiated polyethylene. However, at the higher temperatures, the bond strength of seals prepared as above for the higher irradiated dose polyethylene will be weak and, in many applications, will be unsatisfactory.

In order to obtain improved bond strength at both room temperature and elevated temperatures for polyethylene which has been irradiated with higher doses of radiation, I have found that by interposing between the surfaces of the irradiated polyethylene it is desired to adhere an organic polymeric material of a thermoplastic nature curable by the curing agent, and using such thermoplastic polymeric material in combination with the curing agent as the adhesive, and thereafter causing the surfaces of the irradiated polyethylene to come together in direct contact with the above mixture of thermoplastic polymer and curing agent through the medium of the latter mixture, and thereafter applying heat and pressure in the usual manner employed for heat-sealing thermoplastic materials, I am able to obtain bonds which are not only good at room temperature, but are also exceptionally good at elevated temperatures under even high tension loads. In employing the thermoplastic polymer with the curing agent, consideration should be given to the fact that the cured thermoplastic polymer obtained in the bond area as the result of the heat and pressure sealing step, should have properties at the high temperatures comparable to the properties of the irradiated polyethylene, so that the unitary structure obtained from the adhesive and the irradiated polyethylene is essentially of uniform heat resistance.

The use of the thermoplastic polymer interleaf in combination with a curing agent as a means for adhering irradiated polyethylene irradiated with high radiation doses can also be used obviously with irradiated polyethylene which has been irradiated with lower doses.

Among the thermoplastic polymers which can be advantageously employed in combination with a curing agent are, for instance, solid unirradiated polyethylene, polypropylene; copolymers of ethylene and vinyl acetate; copolymers of isobutylene with other olefins, for instance, copolymers of isobutylene and ethylene, isobutylene and isoprene, etc. In general, I prefer to use solid polyethylene of from 12,000 to 35,000 or more molecular weight (when measured by the intrinsic viscosity method) because the final heat-sealed bond will then comprise a polymeric structure which is essentially uniform throughout the area of the bond and the adhered surfaces of the irradiated polyethylene.

Various methods may be employed for bonding surfaces of irradiated polyethylene by means of a mixture of the thermoplastic polymer and the curing agent. In one instance, comminuted solid thermoplastic polymer, of which polyethylene will be used as an example, is mixed with the requisite amount of the curing agent (that is, the free radical-producing compound, for instance, benzoyl peroxide) so that at elevated temperatures and pressures, the amount of peroxide present in the polymer will effect curing of the thermoplastic unirradiated polymer and thereby give a bond between the surfaces of the irradiated polyethylene. Alternatively, a thin sheet or film of the thermoplastic polymer (for instance, about 0.001 to 0.1 inch or more in thickness) may be coated on the opposite sides of the thermoplastic polymer with the curing agent and the coated sheet material interposed between the surfaces of irradiated polyethylene it is desired to adhere. Treatment of the thermoplastic polymer with the curing agent may be accomplished by applying (e.g., in the form of a 1 to 15%, by weight, dilute aqueous or organic solution) the free-radical-producing compound to the thermoplastic polymer and the latter interposed between the surfaces of the irradiated polyethylene it is desired to adhere as described above. Instead of applying a coating to the surfaces of the thermoplastic polymer, the latter may be dipped, for instance, in a solution of the curing agent, the solvent allowed to evaporate or removed by application of heat insufficient to cause undesirable breakdown of the free-radical-producing compound, and this in turn used as the adhesive for the irradiated polyethylene surfaces. Alternatively, the curing agent may be applied to the surfaces of the irradiated polyethylene and the thermoplastic polymer (either with or without additional coating with the curing agent) interposed, and heat-sealing effected.

Whether using the comminuted mixture, or the sheet material, both containing the curing agent, in either event the irradiated polyethylene surfaces are brought into direct contact with the treated interposed thermoplastic polymer and thereafter subjected to heat and pressure employing the usual thermoplastic heat-sealing equipment for the purpose of causing flow and curing of the unirradiated thermoplastic polymer and to effect a strong adhesive bond between the surfaces of the irradiated polyethylene.

The polyethylene (both irradiated and unirradiated) with which the present invention is concerned is a polymeric material formed by the polymerization of ethylene, usually at high temperatures and pressures, and is more particularly described in U.S. Patent 2,153,553. It is sold commercially under the trade name "Alathon" by E. I. du Pont de Nemours & Co., Inc., Wilmington, Delaware, its properties, uses, etc. being set forth in Du Pont Information Bulletin A-3584, published by the Du Pont Polychemicals Department. This polyethylene may be of various molecular weights, as, for instance, from about 15,000 to as high as 30,000 or more, when measured by the intrinsict viscosity method. Preferably, the molecular weight ranges from about 19,000 to about 25,000. The means and apparatus used whereby the polyethylene can be irradiated are more particularly described in the aforementioned Lawton and Bueche application, Serial No. 324,552 and in the copending application of Elliott J. Lawton, Serial No. 481,152, filed January 11, 1955, and assigned to the same assignee as the present invention. By reference, these two applications are made part of the disclosures of the present application.

The irradiated polyethylene may be in the form of various flat stock materials, usually of uniform thickness and may be in the form of flat sheets, tapes, films, flattened tubing, U-shaped tubing (where the sheet of film or tape is half curved to give a U-shaped body in which the straight members of the U are parallel), etc. The presence of fillers in the unirradiated or irradiated polyethylene such as silica aerogel, other finely divided silicas, carbon black, etc., in amounts ranging, by weight, from 0.5 to 35 percent or more of the weight of the polyethylene is not precluded.

The curing agents employed in combination with the unirradiated polyethylene are free-radical-producing compounds and may be any one of the inorganic or organic peroxide compounds employed for the purpose. Among such compounds which are capable of giving free radicals are inorganic peroxides such as barium peroxide, sodium peroxide, etc.; aliphatic acyl peroxides, e.g., acetyl peroxide, lauryl peroxide, stearyl peroxide, etc.; peroxides of the aromatic acid series, e.g., benzoyl peroxide, mixed organic peroxides, e.g., acetyl benzoyl peroxide; ketone peroxides, e.g., acetone peroxide, triacetone peroxide, etc.; hydrogen peroxide and alkyl derivatives of hydrogen peroxide, e.g., ethyl hydrogen peroxide, diethyl peroxide, di-α-cumyl peroxide, tertiary-butyl-α-cumyl peroxide (the latter two peroxides being members of a class of peroxides used in curing polyethylene as disclosed and claimed in Precopio et al. application Serial No. 509,388, filed concurrently herewith and assigned to the same assignee as the present invention), etc.; peresters such as tertiary-butyl perbenzoate, di-tertiary-butyl diperphthalate, etc.; hydro-peroxides such as tertiary butyl hydroperoxide, etc.; various percompounds, such as perborates, persulfates, perchlorates, etc.; aliphatic azo-compounds, e.g., 2-azo-bis-isobutyronitrile, etc.; organometallic compounds, e.g., tetraethyl lead, tin tetraphenyl, etc. Benzoyl peroxide, di-tertiary-butyl diperphthalate and dicumyl peroxide are preferred catalysts.

The amount of catalyst employed in combination with the thermoplastic polymer, e.g., unirradiated polyethylene, for adhesive purposes may be varied within wide limits, depending upon such factors as temperature and pressure to which the seal will be subjected in the sealing operation, the type of irradiated and unirradiated polyethylene used, the irradiation dose to which the irradiated polyethylene has been subjected, etc.

In general, it is desirable where employing intimate mixtures of the comminuted (e.g., sizes of from 5 to 200 microns average particle diameter) thermoplastic unirradiated polymer and the free-radical-producing compound used as curing agent, that there be employed from about 1 to about 15% or more of the curing agent, based on the weight of the unirradiated polymer. Where another alternative form of the invention is employed, namely, interposing a thin film or sheet of unirradiated polymer, e.g., polyethylene, between the surfaces of the irradiated polyethylene, the free-radical-producing compound in varying concentration may be painted or otherwise applied to the surfaces of unirradiated material, preferably on both sides, to effect curing and adhesion of the irradiated surfaces through the medium of the surfaces of the unirradiated material.

The heat-sealing equipment advantageously empolyed in the practice of the present invention is that conventionally used for heat-sealing thermoplastic polymers. Such equipment is well known and a good description thereof is found in Modern Plastics Encyclopedia for September 1954, published by Plastics Catalog Corporation, Breskin publications, Bristol, Connecticut, pages 345 to 348, 477, 762 and 768 to 770.

In general, the pressure and temperature as well as the dwell time, that is, the time within which pressure and temperature of the sealing apparatus are employed, may be varied widely depending upon such factors as the type of irradiated polyethylene used, the dose of radiation introduced into the polyethylene, the type of thermoplastic polymer employed, the curing agent used, etc. There will be an interdependence of temperature and pressure and dwell time as will be readily apparent to persons skilled in the art. In general, one may employ pressures ranging from about 1 to 50 or more pounds per square inch on the contacing surfaces of the irradiated polyethylene used in making the bonded area. Temperatures of the order of about 300° to 500° F. may be advantageously used, keeping in mind that the higher the temperature, the shorter the dwell time or the time within which the seal being effected will be subjected to the pressure and elevated temperature. Thus, depending upon the temperatures and pressures used, times as low as 0.2 second to as long as 15 seconds or more at temperatures of from about 300° to 500° F. may be advantageously employed. In determining the cycle to be used as far as temperature, pressure, and dwell time are concerned, all factors involved will have to be balanced to give the optimum commercially feasible processing.

In order that those skilled in the art may better understand how the present invention may be practiced, the following examples are given by way of illustration and not by way of limitation. All parts are by weight.

In carrying out the testing of the strength of the seals obtained in the following examples, the following procedure was used. All heat seals were made with a Model 12A Sentinel Heat-Sealer (sold by Packaging Industries Co.) with a 1" x 12" Teflon coated jaw. An automatic controller permited operation at pressures up to 90 p.s.i. (at the jaw) at temperatures up to about 500° F. and at dwell times of 0.25 to 15 sec. The temperatures recorded for the test seals were determined by a thermocouple and dial thermometer. All samples were tested by elongation to break in a Scott tensile tester. The polyethylene tested was a film about 0.0015" thick. A standard width of 1" tape was used for the test, both at room temperature (about 25° C.) and at elevated temperatures, and the result calculated as grams to break. Tape samples 1" wide were tested as received, while sheet samples were heat-sealed as a sheet from which 1" strips were then cut. The polyethylene used had a molecular weight of intrinsic viscosity of about 21,000. In practice, the heat seal was made at a pressure of 30 p.s.i. and at temperatures and dwell times indicated in the examples. The high temperature durability was measured as the time a 1" wide heat-sealed strip supported a load of 15 grams at a temperature of 125° C. Unless otherwise stated, whenever a peroxide was used as a solution, it was usually in the form of a 10% solution of the peroxide in the stipulated solvent.

surfaces of the irradiated polyethylene it was desired to seal. In certain instances as shown in the table below, the organic peroxide curing agent was applied directly to the irradiated polyethylene and the latter heat-sealed as described. A still further modification described in the table below involved making solutions of finely divided unirradiated polyethylene and the particular organic peroxide in hot xylene and painting this solution on the surfaces of the irradiated polyethylene which it was desired to adhere. Finally, finely divided unirradiated polyethylene coated with the organic peroxide, prepared by suspending the two materials in benzene and evaporating the solvent, was used as the adhesive spread on the two surfaces of the irradiated polyethylene it was desired to join; in this latter instance, the weight percents of the unirradiated polyethylene and the organic peroxide were equal. The peroxides used were benzoyl peroxide identified as "BP" and di-tertiary-butyl diperphthalate identified as "DTBDP." The following Table I shows the conditions under which the heat sealing was carried out, as well as the results of tests conducted on the strength of the seal obtained.

Table I

| Irradiation Dose | Method of Sealing | Sealing Conditions | | Room Temp. Strength, grams/in. | High Temp. Durability |
| --- | --- | --- | --- | --- | --- |
| | | Temp., °F. | Dwell Time, sec. | | |
| None | Only direct contact | 450 | 0.5 | 1,910 | 5 sec. |
| 5×10⁶ Roentgens | (1) Only direct contact | 450 | .5 | 1,184 | 30 sec. |
| | (2) Interleaf of unirradiated polyethylene | 450 | .5 | 1,880 | 6 min. |
| | (3) Irradiated polyethylene surfaces painted with 10% xylene solution of DTBDP | 450 | .5 | 1,740 | 4.5 hrs. (average). |
| | (4) Same as (3) | 390 | .5 | 1,665 | 13 min. (average). |
| 10×10⁶ Roentgens | (1) Only direct contact | 300 | 10 | 371 | Not measured |
| | (2) Same as (1) | 390 | 10 | 537 | Do. |
| | (3) Same as (1) | 450 | .5 | 398 | Do. |
| | (4) Same as (1) | 450 | 10 | 481 | 15 sec. |
| | (5) Irradiated polyethylene surfaces painted with 10% benzene solution of BP | 300 | .5 | 348 | Not measured. |
| | (6) Same as (5) | 300 | 10 | 576 | Do. |
| | (7) Same as (5) | 390 | 10 | 647 | Do. |
| | (8) Same as (5) | 450 | 10 | 636 | 25 sec. |
| | (9) Same as (5) | 450 | .5 | 526 | Not measured. |
| | (10) Same as (5) but using DTBDP instead of BP | 450 | 10 | 595 | 25 sec. |
| | (11) Interleaf of unirradiated polyethylene | 450 | 10 | 1,610 | 10 min. |
| | (12) Interleaf of unirradiated polyethylene painted with 10% benzene solution of BP | 450 | .5 | 1,470 | ₐ 8 hrs. |
| | (13) Same as (12) | 450 | 10 | 1,530 | ₐ 6.25 hrs. |
| | (14) Same as (12) but using DTBDP instead of BP | 450 | .5 | 1,410 | ₐ 5.5 hrs. |
| | (15) Same as (14) | 450 | 10 | 1,435 | ₐ 8 hrs. |
| | (16) Xylene solution containing, by weight, 2% unirradiated polyethylene and 2% DTBDP | 450 | .5 | 1,260 | ₐ 6 hrs. |
| | (17) Powdered unirradiated polyethylene coated with DTBDP (equal parts by weight) | 450 | 10 | 614 | ₐ 5.75 hrs. |

ₐ Test piece unbroken when removed from test at time indicated.

EXAMPLE 1

In this example, a strip of unirradiated polyethylene was sealed to itself as described above, employing sealing conditions as recited in the table below, which also gives the strength of the seal at room temperature and at the elevated temperatures. Other samples were prepared for sealing polyethylene which had been irradiated in one instance with a 5×10⁶ R. and in another instance with 10×10⁶ R., in accordance with the procedure described in the aforementioned Lawton et al. application. In connection with the preparation of the polyethylene which was irradiated with the varying doses of high energy electrons, the manner of forming the seal was varied also. In one instance, an interleaf of unirradiated polyethylene film 0.0015" thick by about 0.5" wide was placed between the irradiated polyethylene film layers either without any further treatment or with treatment whereby the interleaf was soaked for about 3 hours in a 10% solution of the specified peroxide in benzene, and then the treated interleaf was dried to leave behind a coating of the curing agent and interposed between the In the above-mentioned table, where the room temperature strength was below 700 grams/inch, the durability of the seal at high temperature was not tested to determine the ability of the seal to hold at the 125° C. temperature. It is of interest to note that, as shown in (3) at a dose of about 5×10⁶ R., the use of some form of unirradiated polyethylene was not necessary, presumably because the irradiated film contained sufficient amounts of uncrosslinked polymer. In this case, peroxide alone sufficed to yield high temperature durability if a high enough sealing temperature was used, despite the fact that a dwell time of only 0.5 second was employed. At 10×10⁶ R., some form of unirradiated polyethylene along with a curing agent therefor was necessary to produce high temperature durability not obtainable by the use of the peroxide alone under the conditions of this test. Under other conditions, such as those in Example 3 (infra), high temperature durability was achieved without the aid of unirradiated polyethylene along with the curing agent at a dose level of 20×10⁶ R.

EXAMPLE 2

This example illustrates the effect of varying the sealing conditions on the high temperature performance of such seals of adjacent surfaces of irradiated polyethylene. The same apparatus for sealing was employed in this example as was used in Example 1, and in each instance the heat seal was operated at 30 p.s.i. The peroxide used throughout this work was di-tertiary-butyl-diperphthalate identified as "DTBDP." This di-tertiary-butyl-diperphthalate was applied alone or with unirradiated polyethylene in the form of a hot xylene solution, with the aid of a ½ inch wide lambskin covered roller. The solution was allowed to dry before the heat-seal was prepared. The room temperature strength of the seals was measured simularly as in Example 1 on a 1" wide strip elongated to break in a Scott tester. The average of five to six determinations was recorded in grams/inch to break. The high temperature strength of the seals was measured by subjecting a 1" wide strip to a load of 15, 30, 45 or 60 grams at 125° C. and recording the time to break. The seals were then classified in the following manner:

A. Supported load more than 30 minutes
B. Supported load 4 to 30 minutes
C. Supported load less than 4 minutes Many of the test seals which survived 30 minutes under load at 125° C. were left in the oven in which they were being tested over an extended period of time, and were still intact 6 to 8 hours later. Most of the seals which failed at 125° C. did so in less than 4 minutes.

The loads selected for these tests, if applied to a cross section 0.0015" x 1", would give tensile loadings as follows:

Table II

| | P.s.i. |
|---|---|
| 15 grams | 22 |
| 30 grams | 44 |
| 45 grams | 66 |
| 60 grams | 88 |

The tests reported in Table III below concern polyethylene film irradiated with a dose of $5 \times 10^6$ R. and thereafter treated in the seal area with a solution containing only the peroxide. The results described in Table IV below refer to polyethylene film treated with $10 \times 10^6$ R. and treated with a solution containing 2%, by weight, of each of the peroxides and of the unirradiated polyethylene. The results described in Table V below refer to film which had been irradiated with a dose of $10 \times 10^6$ R. and thereafter treated in the seal area with a solution containing 5%, by weight, of each of the mentioned peroxides and of the unirradiated polyethylene.

Table III

[Irradiation dose in film: $5 \times 10^6$ Roentgens. Solution treatment: 5% peroxide in xylene]

| | Load, Grams/Inch | Heat-sealing Dwell Time | | |
|---|---|---|---|---|
| | | 0.5 sec. | 1.0 sec. | 2.0 sec. |
| X | | 1,550 gm./in. | 1,440 gm./in. | 1,550 gm./in. |
| Y | 15 | ABC | AAB | AAA |
|   | 30 | BBC | ACC | AAC |
|   | 45 | CCC | CCC | CCC |
|   | 60 | CCC | CCC | CCC |

X=gm./inch to break at room temperature.
Y=ability at 125° C. to support load (grams/inch) indicated in next column.

Table IV

[Irradiation dose in film: $10 \times 10^6$ Roentgens. Solution treatment: 2% peroxide+2% unirradiated polyethylene in xylene]

| Dwell Time | 0.5 sec. | | 2.5 sec. | | 5 sec. | |
|---|---|---|---|---|---|---|
| Heat-Sealing Temperature | X | Y | X | Y | X | Y |
| 300° F | 1,085 | CCC | 1,165 | CCC | | |
|        | 962   | CCC | 853   | CCC | | |
| 350° F | 876   | CCC | 1,085 | CAA | | |
|        | 1,105 | CCC | 1,265 | CCC | | |
| 390° F | 1,250 | CCC | 1,385 | CAA | 1,375 | AAA |
|        | 1,300 | CCC | 1,265 | CCC | 1,250 | AAA |
| 420° F | 1,110 | CCC | 1,170 | AAA | 1,200 | AAA |
|        | 1,055 | CCA | 1,210 | AAA | 1,325 | AAA |
| 450° F | 1,260 | AAA | 1,160 | AAA | | |
|        | 1,235 | AAA | 1,325 | AAA | | |

X=grams/inch to break at room temperature.
Y=ability at 125° C. to support 15 grams/inch load.

Table V

[Irradiation dose in film: $10 \times 10^6$ Roentgens. Solution treatment: 5% peroxide+5% unirradiated polyethylene in xylene]

| Heat-Sealing Temp. | | Load, Grams/Inch | Heat-Sealing Dwell Time | | |
|---|---|---|---|---|---|
| | | | 0.5 sec. | 1 sec. | 2 sec. |
| 300° F | X | | | 1,330 | |
|        | Y | 15 | CCC | CCC | |
|        |   | 30 | CCC | CCC | |
| 390° F | X | | | 1,440 | |
|        |   | 15 | AAA | | |
|        |   | 30 | AAA | AAA | AAA |
|        | Y | 45 | AAA | AAB | ABC |
|        |   | 60 | BCC | CCC | CCC |
| 450° F | X | | | 1,160 | |
|        |   | 15 | AAA | | |
|        |   | 30 | AAC | | |
|        | Y | 45 | CCC | | |
|        |   | 60 | CCC | | |

X=grams/inch to break at room temperature.
Y=ability at 125° C. to support weight indicated in hext column.

EXAMPLE 3

Polyethylene tape 0.0015" x 0.75" was irradiated as described above with varying doses of high energy electrons ranging from 5 to $20 \times 10^6$ R. Thereafter, the area of the irradiated polyethylene to be sealed was coated with a 10%, by weight, solution of dicumyl peroxide in xylene, the coating allowed to air dry until all the xylene had volatilized, and thereafter the film was heat-sealed similarly as was done in the preceding examples by the application of a pressure of 30 p.s.i. for 0.5 second at 430–440° F. Each of the sealed test pieces was tested by placing it in an oven at 125° C. and suspending therefrom in a manner described in the preceding two examples, a load of 15 grams. As a result of the foregoing tests, it was found that heat-sealed samples of irradiated polyethylene irradiated with doses of 5, 7.5, 10, 12, 15 and $20 \times 10^6$ R. were still intact under the above test conditions after 15 minutes. This example illustrates the advantage which certain peroxides, such as dicumyl peroxide, have over other peroxides at higher irradiation doses employing otherwise equivalent conditions, and using only the peroxide as the adhesive without any non-irradiated thermoplastic polymer.

It will be apparent from an examination of the above examples that the particular temperature used, as well as the dwell time, will vary in each instance, depending upon such factors as the method of adhesion, the pressure applied, the degree of irradiation, the type of thermoplastic polymer and molecular weight of the thermoplastic polymer, e.g., polyethylene, used as the adhesive, the proportion of curing agent for the unirradiated polyethylene, etc. Persons skilled in the art will have little difficulty in determining with at most slight effort in each instance the optimum temperature, pressure, and dwell time conditions.

It will be apparent to those skilled in the art that other curing agents for the unirradiated polyethylene, including free radical type compounds such as those mentioned previously, may be employed in place of the di-tertiary butyl-diperphthalate, or cumyl peroxide or the benzoyl peroxide used in the foregoing examples. The concentration of these curing agents may be varied widely as pointed out previously. The manner of effecting the seal, i.e., whether using only the free radical-producing curing agent, or an interleaf of unirradiated polyethylene treated with the curing agent for the unirradiated polyethylene, or when applying solutions of the unirradiated polyethylene and the curing agent therefor, etc., may also be varied and no intent is to be read into the foregoing descriptions that they are limiting.

The present invention finds application wherever irradiated polyethylene is required to be sealed to itself. Thus, when using irradiated polyethylene tape as insulation for conductors, this insulation is often applied by a winding operation, whereby one ply overlaps the adjacent ply. It is often desirable to effect a more intimate bond between the overlaps of irradiated polyethylene than may be obtained by merely heat-treating under pressure the total wound assembly. By means of the above-described invention, it is possible to treat at least one or both contacting surfaces of the irradiated polyethylene in the various manners described above prior to the winding operation, and thereafter effecting heat-sealing by using elevated temperatures and pressures to yield a stronger bond.

Another application in which the above-described invention can be employed is in connection with sterilizable containers made of irradiated polyethylene film. Generally, such containers require a heat-seal serviceable at elevated temperatures, and such a seal is not ordinarily obtainable by the application of conventional sealing methods. By means of my invention, one can treat the contacting surfaces of the irradiated polyethylene which will form the seal in the manner described above and thereafter subject the assembly to elevated temperatures and pressures to give a strong seal, capable of resisting deterioration at high temperatures and capable of resisting the same conditions to which the remainder of the sterilizable container will be subjected.

An application for which the invention is especially suitable involves making heavy-walled containers from irradiated sheet polyethylene. Ordinarily, it is not feasible to make these heavy-walled containers from unirradiated sheet polyethylene by joining the unirradiated surfaces, and thus irradiating the container. This is due to the fact that uniform irradiation of the formed container as such is not practical because of the configuration of the container. By means of my invention, such thick sheets can be first irradiated with high energy radiation, for instance, with high energy electrons, and thereafter the ends can be sealed at the seams by means of any one of the methods described previously.

One of the unexpected results of practicing my invention is the fact that contrary to what might be expected, employing the sealing techniques described above, no satisfactory seal was obtained when attempting to adhere irradiated polyethylene surfaces with, for instance, ethyl cellulose, cellophane, polyethylene terephthalate (known as "Mylar"), polyvinyl alcohols, sized glass cloth, desized glass cloth, kraft paper, or aluminum foil.

The Roentgen units, designated as "R." in the foregoing description of the invention and in the appended claims, are intended in their usual connotation and are defined as the amount of radiation that produces one electrostatic unit of charge or ion pairs per millilitre of dry air under standard conditions and, as employed herein, refer to the amount of electron radiation measured with an air equivalent ionization chamber at the position of the surface of the polyethylene being irradiated.

What I claim as new and desire to secure by Letters Patent of the United States is:

1. The process for sealing a surface of irradiated polyethylene to another surface of high energy electron irradiated polyethylene which comprises (1) interposing between the surfaces of the irradiated polyethylene it is desired to adhere, a free-radical-producing curing agent for thermoplastic polymers selected from the class consisting of inorganic peroxides, organic peroxides, organic hydroperoxides, organic peresters, aliphatic azo compounds, perborates, persulfates, perchlorates, tetraethyl lead and tin tetraphenyl, and (2) thereafter applying heat and pressure to the area to effect sealing of one surface of the irradiated polyethylene to the other contacting surface of the irradiated polyethylene.

2. An article of manufacture containing a seal composed of two surfaces of high energy electron irradiated polyethylene adhered by means of a heat and chemically cured layer of a thermoplastic polymer employing as the curing agent for the thermoplastic polymer, a free-radical-producing compound selected from the class consisting of inorganic peroxides, organic peroxides, organic hydroperoxides, organic peresters, aliphatic azo compounds, perborates, persulfates, perchlorates, tetraethyl lead and tin tetraphenyl.

3. The process for sealing a surface of high energy electron irradiated polyethylene to another surface of high energy electron irradiated polyethylene which comprises (1) interposing between the surfaces of the irradiated polyethylene it is desired to adhere, a thermoplastic polymer intimately associated with a free-radical-producing curing agent for the latter selected from the class consisting of inorganic peroxides, organic peroxides, organic hydroperoxides, organic peresters, aliphatic azo compounds, perborates, persulfates, perchlorates, tetraethyl lead and tin tetraphenyl, and (2) thereafter applying heat and pressure to the area to effect sealing of one surface of the irradiated polyethylene to the other contacting surface of the irradiated polyethylene.

4. The process for sealing a surface of high energy electron irradiated polyethylene to another surface of high energy electron irradiated polyethylene which comprises (1) interposing between the surfaces of the irradiated polyethylene it is desired to adhere, unirradiated polyethylene intimately associated with a free-radical-producing curing agent for the latter selected from the class consisting of inorganic peroxides, organic peroxides, organic hydroperoxides, organic peresters, aliphatic azo compounds, perborates, persulfates, perchlorates, tetraethyl lead and tin tetraphenyl, and (2) thereafter applying heat and pressure to the area to effect sealing of one surface of the irradiated polyethylene to the other contacting surface of the irradiated polyethylene.

5. The process for sealing a surface of high energy electron irradiated polyethylene to another surface of high energy electron irradiated polyethylene which comprises (1) interposing between the surfaces of the irradiated polyethylene it is desired to adhere, polypropylene intimately associated with a free-radical-producing curing agent for the latter selected from the class consisting of inorganic peroxides, organic peroxides, organic hydroperoxides, organic peresters, aliphatic azo compounds, perborates, persulfates, perchlorates, tetraethyl lead and tin tetraphenyl, and (2) thereafter applying heat and pressure to the area to effect sealing of one surface of the irradiated polyethylene to the other contacting surface of the irradiated polyethylene.

6. The process for sealing a surface of high energy electron irradiated polyethylene to another surface of high energy electron irradiated polyethylene which comprises (1) interposing between the surfaces of irradiated polyethylene it is desired to adhere, unirradiated polyethylene intimately associated with a curing agent for the latter comprising benzoyl peroxide, and (2) thereafter applying pressure and heat in excess of 300° F. to the area to effect sealing of one surface of irradiated polyethylene to the other contacting surface of the irradiated polyethylene.

7. The process for sealing a surface of high energy electron irradiated polyethylene to another surface of high energy electron irradiated polyethylene which comprises (1) interposing between the surfaces of irradiated polyethylene it is desired to adhere, unirradiated polyethylene intimately associated with a curing agent for the latter comprising di-tertiary-butyl diperphthalate, and (2) thereafter applying pressure and heat in excess of 300° F. to the area to effect sealing of one surface of irradiated polyethylene to the other contacting surface of the irradiated polyethylene.

8. The process for sealing surfaces of high energy electron irradiated polyethylene which comprises (1) interposing between the surfaces of the irradiated polyethylene it is desired to adhere, a film of unirradiated polyethylene coated with a curing agent for the latter comprising benzoyl peroxide, and (2) thereafter pressing the assembly at a temperature above 300° F. to effect sealing of one surface of the irradiated polyethylene to the other contacting surface of the irradiated polyethylene.

9. The process for sealing surfaces of high energy electron irradiated polyethylene which comprises (1) interposing between the surfaces of the irradiated polyethylene it is desired to adhere, a film of unirradiated polyethylene coated with a curing agent for the latter comprising di-tertiary-butyl diperphthalate, and (2) thereafter pressing the assembly at a temperature above 300° F. to effect sealing of one surface of the irradiated polyethylene to the other contacting surface of the irradiated polyethylene.

10. The process for sealing surfaces of high energy electron irradiated polyethylene which comprises (1) applying to at least one surface of the irradiated polyethylene it is desired to adhere, a mixture of ingredients comprising finely divided unirradiated polyethylene and an organic peroxide curing agent for the latter, and (2) thereafter applying pressure and heat in excess of 300° F. to the area to effect sealing of one surface of irradiated polyethylene to the other contacting surface of the irradiated polyethylene.

11. The process as in claim 10 in which the unirradiated polyethylene and peroxide curing agent are in the form of a solution in an organic solvent when applied to the surface of the irradiated polyethylene.

12. The process for heat-sealing a surface of high energy electron irradiated polyethylene to another surface of high energy electron irradiated polyethylene which comprises (1) coating one of the surfaces it is desired to adhere with an organic solution of unirradiated polyethylene and benzoyl peroxide, (2) placing the other irradiated polyethylene surface in intimate contact with the coated, irradiated polyethylene surface, and (3) thereafter heating the superposed surfaces at a temperature ranging from about 300° to 500° F. and at pressures in excess of one pound per square inch on the contacting surfaces of the irradiated polyethylene.

13. The process for heat-sealing a surface of high energy electron irradiated polyethylene to another surface of high energy electron irradiated polyethylene which comprises (1) coating one of the surfaces it is desired to adhere with an organic solution of unirradiated polyethylene and dicumyl peroxide, placing the other irradiated polyethylene surface in intimate contact with the coated, irradiated polyethylene surface, and (2) thereafter heating the superposed surface at a temperature ranging from about 300° to 500° F. and at pressures in excess of one pound per square inch on the contacting surfaces of the irradiated polyethylene.

14. The process for heat-sealing a surface of high energy electron irradiated polyethylene to another surface of high energy electron irradiated polyethylene which comprises (1) coating one of the aforesaid surfaces with an organic solution of dicumyl peroxide, (2) placing the other irradiated polyethylene surface in intimate contact with the coated irradiated polyethylene surface, and (3) thereafter heating the superposed surfaces at a temperature ranging from about 300° to 500° F. and at pressures in excess of 1 pound per square inch on the contacting surfaces of the irradiated polyethylene.

15. The process for heat-sealing a surface of high energy electron irradiated polyethylene to another surface of high energy electron irradiated polyethylene which comprises (1) coating one of the aforesaid surfaces with an organic solution of benzoyl peroxide, (2) placing the other irradiated polyethylene surface in intimate contact with the coated irradiated polyethylene surface, and (3) thereafter heating the superposed surfaces at a temperature ranging from about 300° to 500° F. and at pressures in excess of 1 pound per square inch on the contacting surfaces of the irradiated polyethylene.

16. The process for heat-sealing a surface of high energy electron irradiated polyethylene to another surface of high energy electron irradiated polyethylene which comprises (1) coating one of the aforesaid surfaces with an organic solution of di-tertiary-butyl diperphthalate, (2) placing the other irradiated polyethylene surface in intimate contact with the coated irradiated polyethylene surface, and (3) thereafter heating the superposed surfaces at a temperature ranging from about 300° to 500° F. and at pressures in excess of 1 pound per square inch on the contacting surfaces of the irradiated polyethylene.

17. The process for heat-sealing one surface of high energy electron irradiated polyethyelne to another surface of high energy electron irradiated polyethylene which comprises (1) interposing between the surfaces a curing agent for polyethylene which is a free-radical-producing compound and is selected from the class consisting of inorganic peroxides, organic peroxides, organic hydroperoxides, organic peresters, aliphatic azo compounds, perborates, persulfates, perchlorates, tetraethyl lead and tin tetraphenyl, (2) placing the irradiated polyethylene surfaces in contact with each other, and (3) thereafter applying heat and pressure to the contacting area to effect sealing of the irradiated polyethylene surfaces.

References Cited in the file of this patent

UNITED STATES PATENTS

| 2,622,056 | De Coudres et al. | Dec. 16, 1952 |
| 2,648,097 | Kritchever | Aug. 11, 1953 |
| 2,664,378 | Heller | Dec. 29, 1953 |
| 2,675,339 | Zenftman | Apr. 13, 1954 |
| 2,697,058 | Lasak | Dec 14, 1954 |
| 2,715,363 | Hoover | Aug. 16, 1955 |
| 2,721,821 | Hoover | Oct. 25, 1955 |
| 2,746,193 | Billian | May 22, 1956 |
| 2,763,609 | Lewis et al. | Sept. 18, 1956 |
| 2,801,446 | Wolinski | Aug. 6, 1957 |